United States Patent
Ferrara

(10) Patent No.: US 7,172,221 B1
(45) Date of Patent: Feb. 6, 2007

(54) PIPE STABILIZING SYSTEM

(76) Inventor: Joseph F. Ferrara, 21 Courtney Dr., Farmingville, NY (US) 11783

( * ) Notice: Subject to any disclaimer, the term of this patent is extended or adjusted under 35 U.S.C. 154(b) by 160 days.

(21) Appl. No.: 11/055,762

(22) Filed: Feb. 11, 2005

(51) Int. Cl.
*F16L 3/00* (2006.01)

(52) U.S. Cl. ............. 285/61; 285/64; 285/180; 248/65

(58) Field of Classification Search .......... 285/61, 285/24, 64, 180, 133.5; 248/65, 67.7, 62, 248/73, 74.4; 138/158
See application file for complete search history.

(56) References Cited

U.S. PATENT DOCUMENTS

| | | | |
|---|---|---|---|
| 1,322,330 A * | 11/1919 | Neames | 138/109 |
| D157,594 S | 3/1950 | Hollgender | |
| 2,823,407 A | 2/1958 | Hempel | |
| 3,633,943 A | 1/1972 | Ramm | |
| 3,666,015 A | 5/1972 | Livingston | |
| 3,847,392 A | 11/1974 | Horwinski | |
| 4,256,181 A | 3/1981 | Searcy | |
| 4,842,227 A * | 6/1989 | Harrington et al. | 248/74.4 |
| 5,370,345 A * | 12/1994 | Condon | 248/65 |
| 5,689,938 A | 11/1997 | Lyall et al. | |
| 6,065,782 A * | 5/2000 | Allen, Jr. | 285/114 |
| 6,276,461 B1 | 8/2001 | Stager | |
| 6,301,838 B1 * | 10/2001 | Hall | 248/65 |
| 6,488,097 B1 | 12/2002 | MacDonald, III et al. | |
| 6,595,560 B1 * | 7/2003 | Guitoneau | 285/114 |

* cited by examiner

*Primary Examiner*—David Bochna

(57) ABSTRACT

A pipe stabilizing system includes a pipe having an inlet and an outlet. An angled inner plate has a first portion and a second portion. The first portion has a first aperture defining a saddle for receiving pipe. An angled outer plate has a first section and a second section. The first section has a second aperture therein defining a saddle for receiving pipe. The first aperture in the inner plate is aligned with the second aperture in the outer plate when the second section is abutted against the second portion. The pipe is positionable in each of the first and second apertures and secured between the first portion and the first section. Fasteners are extended through the second portion and the second section and then into a hood housing. A fire retardant supply line is fluidly coupled to the inlet and a nozzle is fluidly coupled to the outlet.

5 Claims, 3 Drawing Sheets

US 7,172,221 B1

PIPE STABILIZING SYSTEM

BACKGROUND OF THE INVENTION

1. Field of the Invention

The present invention relates to pipe stabilizing devices and more particularly pertains to a new pipe stabilizing device for stabilizing, to an exhaust hood, a pipe fluidly coupled to a nozzle to ensure that the pipe is not easily moveable.

2. Description of the Prior Art

The use of pipe stabilizing devices is known in the prior art. U.S. Pat. No. 6,276,461 describes a device a fire extinguisher system that includes a bracket assembly for holding pipes fluidly coupled to a source of fire retardant. A similar device is found in U.S. Pat. No. 4,256,181 which again includes a piping a bracket assembly for supporting a fire extinguishing nozzle above a stove. Another type of pipe stabilizing device is U.S. Pat. No. 6,488,097 having a central hub and mounts for mounting a nozzle where required.

While these devices fulfill their respective, particular objectives and requirements, the need remains for a device that prevents a person from altering the positioning of a nozzle by the rotation of the pipe linkage between a nozzle and a supply line. Such movement places the nozzle in a position which is not optimal for putting out a fire in a fryer or on a stove cook top.

SUMMARY OF THE INVENTION

The present invention meets the needs presented above by comprising a pipe at least including one inlet and one outlet fluidly coupled together at a generally perpendicular angle. An inner plate has a bend therein so that first portion and a second portion of the inner plate are defined. The first portion has a first aperture therein having a generally same shape as the pipe. The first aperture has a smaller size than the pipe so that the first aperture defines a saddle for the pipe. The second portion has a plurality of bores extending therethrough. An outer plate has bend therein so that first section and a second section of the outer plate are defined. The first section has a second aperture therein having generally the same shape as the pipe. The second aperture has a smaller size than the pipe so that the second aperture defines a saddle for the pipe. The second section has a plurality of bores extending therethrough. The first aperture in the inner plate is aligned with the second aperture in the outer plate when the second section is abutted against the second portion. The pipe is positionable in each of the first and second apertures when the first and second apertures are aligned so that the pipe is secured between the first portion and the first section. The bores in the second portion are aligned with the bores in the second section when the pipe is positioned in the first and second apertures. Each of a plurality of fasteners is extended through aligned pairs of the bores and into a hood housing. A fire retardant supply line is fluidly coupled to the inlet and a nozzle is fluidly coupled to the outlet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
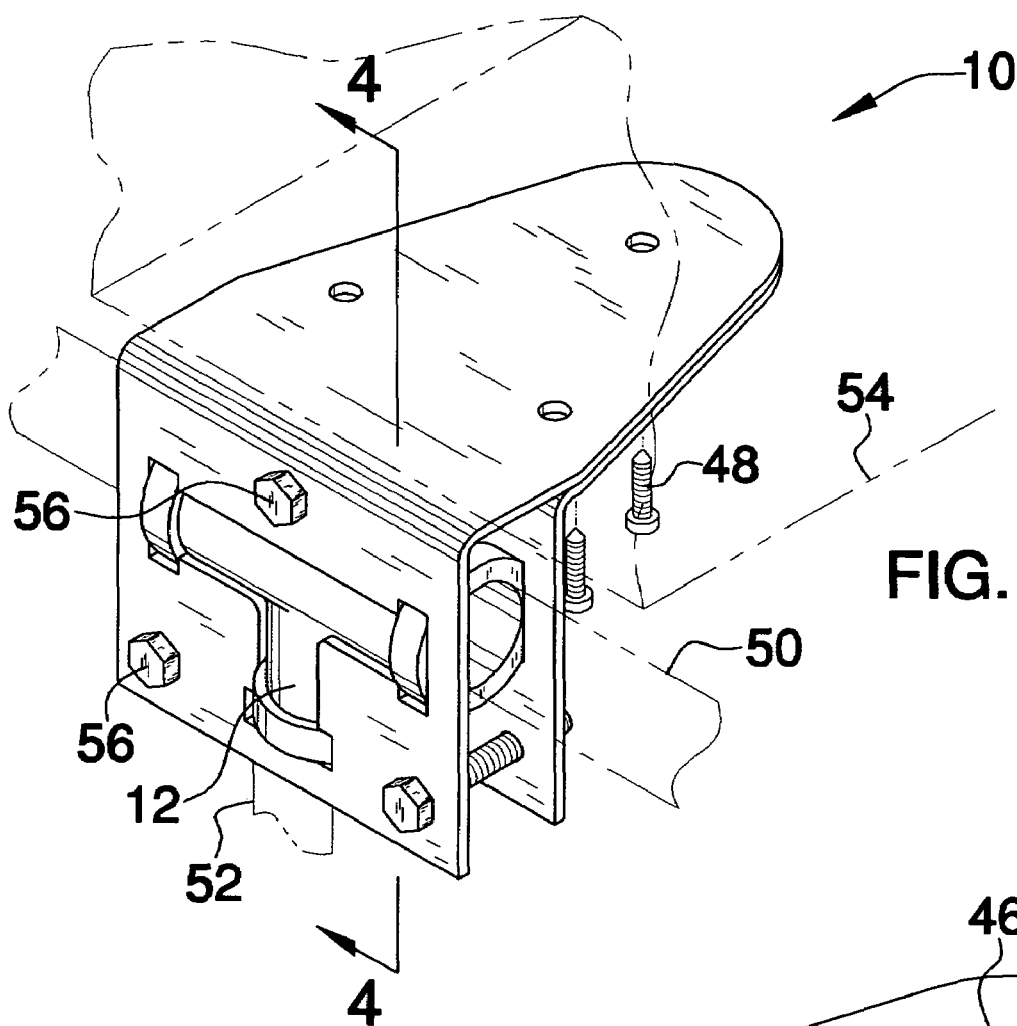
FIG. 1 is a perspective view of a first embodiment of a pipe stabilizing system according to the present invention.
Figure 2:
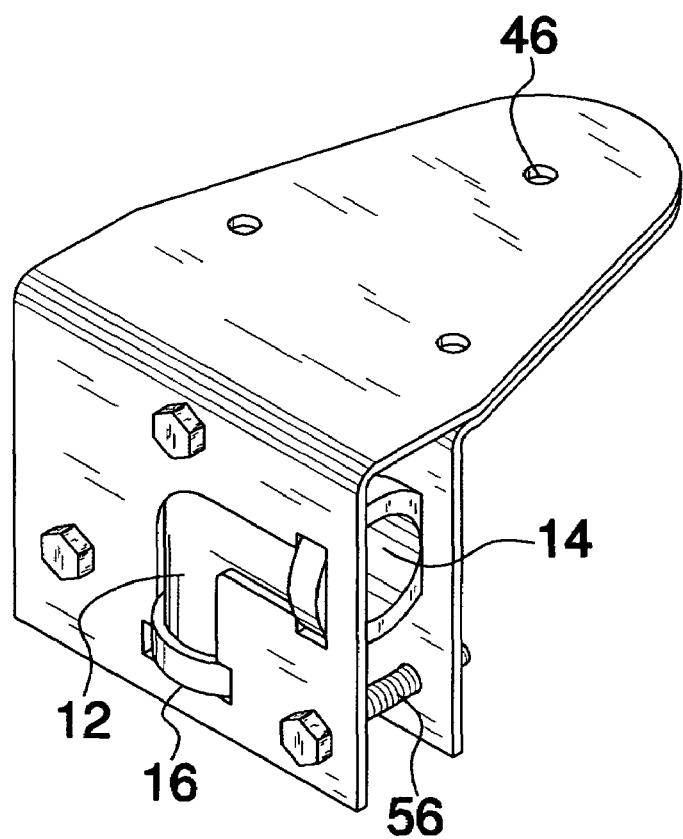
FIG. 2 is a perspective view of a second embodiment of the present invention.
Figure 3:
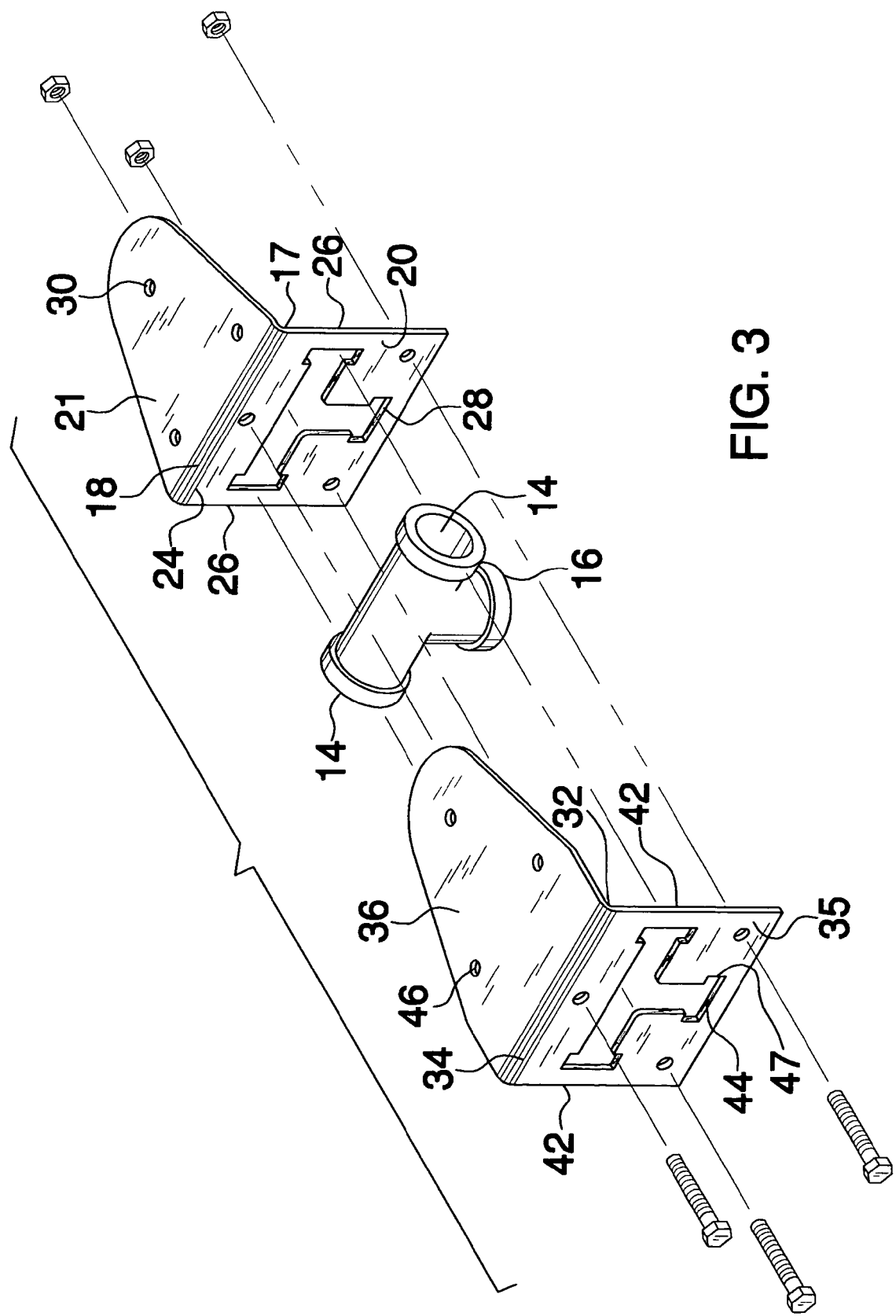
FIG. 3 is an expanded view of the present invention.
Figure 4:
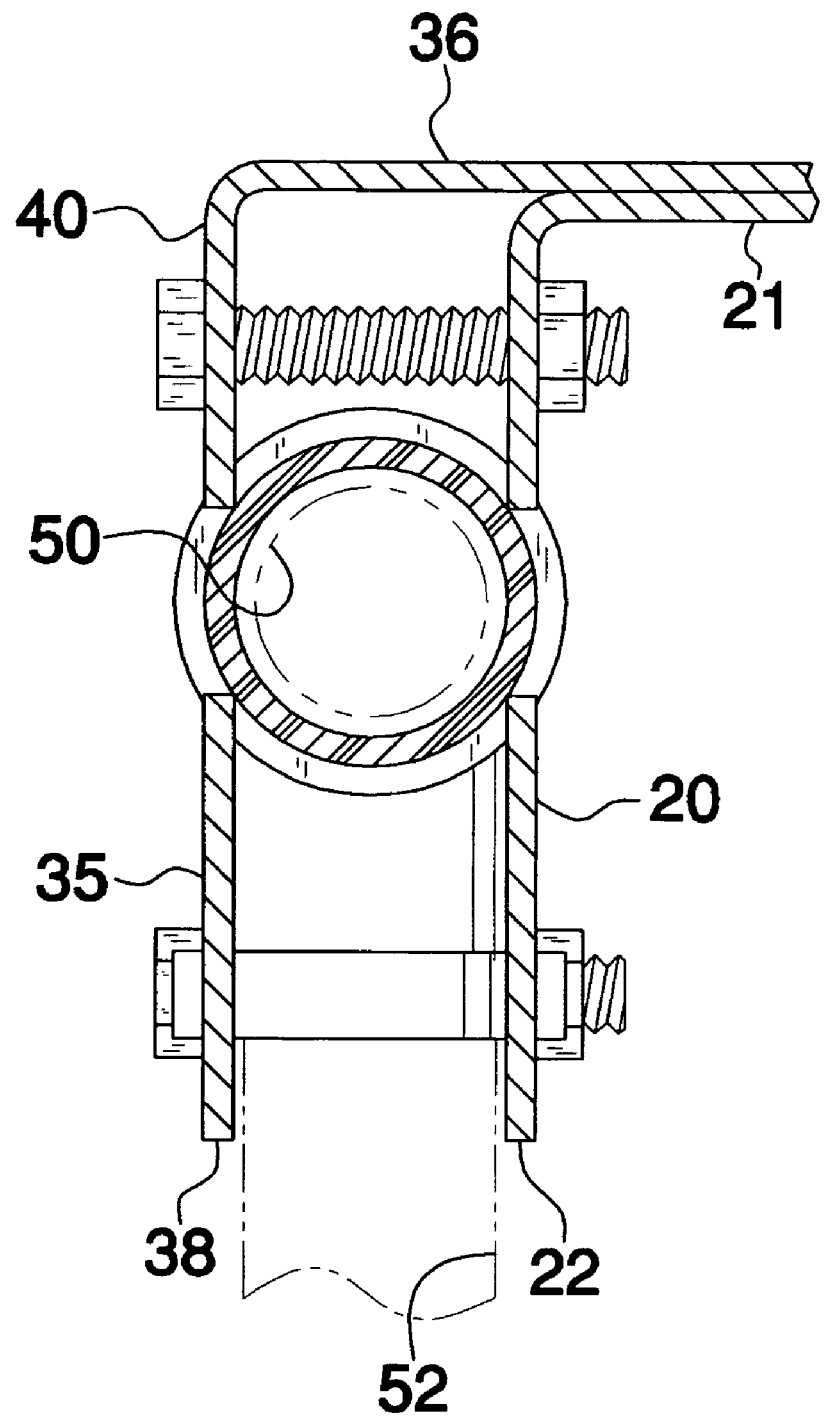
FIG. 4 is a cross-sectional view taken along line 4—4 of FIG. 1 of the present invention.

With reference now to the drawings, and in particular to FIGS. 1 through 4 thereof, a new pipe stabilizing device embodying the principles and concepts of the present invention and generally designated by the reference numeral 10 will be described.

As best illustrated in FIGS. 1 through 4, the pipe stabilizing system 10 generally comprises a pipe 12 at least including one inlet 14 and one outlet 16 fluidly coupled together at a generally perpendicular angle. The pipe 12 may include a pair of inlets 14 which are axially aligned.

An inner plate 17 is provided that has a bend 18 therein so that a first portion 20 and a second portion 21 of the inner plate 17 are defined. The first portion 20 is orientated perpendicular to the second portion 21. The first portion 20 has a peripheral edge that includes a bottom edge 22, an upper edge 24 abutting the second portion 21 and a pair of lateral edges 26. The first portion 20 has a first aperture 28 therein that generally has the same shape as the pipe 12. The first aperture 28 has a smaller size than the pipe 12 so that the first aperture 28 defines a saddle for the pipe 12. The pipe 12 is positionable in the first aperture 28 so that the pipe 12 abuts a peripheral edge of the first aperture 28 and the outlet 16 is directed away from upper edge 24. The second portion 21 has a plurality of bores 30 extending therethrough.

An outer plate 32 has a bend 34 therein so that a first section 35 and a second section 36 of the outer plate 32 are defined. The first section 35 is orientated perpendicular to the second section 36. The first section 35 has a perimeter edge that includes a lower edge 38, a top edge 40 abutting the second section 36 and a pair of side edges 42. The first section 35 has a second aperture 44 therein that generally has the same shape as the pipe 12. The second aperture 44 of the outer plate 32 again has a smaller size than the pipe 12 so that the second aperture 44 defines a saddle for the pipe 12. The pipe 12 is positionable in the second aperture 44 in the outer plate 32 so that the pipe 12 abuts a peripheral edge of the second aperture 44 and the outlet 16 is directed away from top edge 40. The second section 32 has a plurality of bores 46 extending therethrough. The first aperture 28 in the inner plate 17 is aligned with the second aperture 44 in the outer plate 32 when the second section 36 is abutted against the second portion 21. The pipe 12 is positionable in each of the first 28 and second 44 apertures when the first 28 and second 44 apertures are aligned. This secures the pipe 12 between the first portion 20 and the first section 21. The bores 30 in the second portion 21 are aligned with the bores 46 in the second section 36 when the pipe 12 is positioned in the first 28 and second 44 apertures. The first 28 and second 44 apertures may include notches 47 for the receiving of bushings, flanges or couplers attached to the pipes 12 which aid in securing the pipes 12 to supply lines 50 and nozzles 52.

Each of a plurality of fasteners 48 is provided. Each of the fasteners 48 is extended through aligned pairs of the bores 30, 36 and into a hood housing 54 so that the inner 17 and outer 32 plates are attached to the hood housing 54. The hood housing 54 is a conventional hood housing having an exhaust fan therein and used in a commercial kitchen setting positioned over fryers and/or stove tops.

A plurality of securing members 56 extends through and secures together the first section 35 and the first portion 20 so that the pipe 12 is firmly secured within the aligned first 28 and second 44 apertures.

A fire retardant supply line 50 is fluidly coupled to the inlet 14 and a nozzle 52 is fluidly coupled to the outlet 16. If a plurality of nozzles 52 is to be used, a plurality of pipes 12 each having a pair of inlets 14 is fluidly connected in series so that nozzles 52 may be positioned where needed.

In use, the pipe 12 is placed between an inner plate 17 and an outer plate 32 and secured to the hood 54 where needed. The nozzle 52 is then attached to the outlet 16 so that it is directed toward a cooking device. The inner 17 and outer 32 plates prevent a restaurant employee from twisting the pipe 12 in order to alter the positioning of the nozzle 52.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A clamp system for selectively immobilizing a fire suppression supply line comprising:

a pipe at least including one inlet and one outlet fluidly coupled together at a generally perpendicular angle;

an inner plate having a bend therein such that a first portion and a second portion of said inner plate are defined, said first portion having a first aperture therein having generally a same shape as said pipe, said first aperture having a smaller size than said pipe such that said first aperture defines a saddle for said pipe, said second portion having a plurality of bores extending therethrough;

an outer plate having a bend therein such that a first section and a second section of said outer plate are defined, said first section having a second aperture therein having generally a same shape as said pipe, said second aperture having a smaller size than said pipe such that said second aperture defines a saddle for said pipe, said second section having a plurality of bores extending therethrough, said first aperture in said inner plate being aligned with said second aperture in said outer plate when said second section is abutted against said second portion, said pipe being positionable in each of said first and second apertures when said first and second apertures are aligned such that said pipe is secured between said first portion and said first section, said bores in said second portion being aligned with said bores in said second section when said pipe is positioned in said first and second apertures;

a plurality of fasteners, each of said fasteners extending through aligned pairs of said bores and into a hood housing;

a fire retardant supply line being fluidly coupled to said inlet; and a nozzle being fluidly coupled to said outlet.

2. The system according to claim 1, wherein said first portion is orientated perpendicular to said second portion and said first section is orientated perpendicular to said second section.

3. The system according to claim 1, wherein said first portion has a peripheral edge that includes a bottom edge, an upper edge abutting said second portion and a pair of lateral edges, said pipe being positionable in said first aperture in said first portion such that said pipe abuts a peripheral edge of said first aperture and said outlet is directed away from upper edge, said first section having a perimeter edge including a lower edge, a top edge abutting said second section and a pair of side edges, said pipe being positionable in said second aperture in said first section such that said pipe abuts a peripheral edge of said second aperture and said outlet is directed away from top edge.

4. The system according to claim 1, further including a plurality of securing members, each of said securing members extending through and removably securing together said first portion and said first section when said pipe is positioned in said first and second apertures.

5. A clamp system for selectively immobilizing a fire suppression supply line comprising:

a pipe at least including one inlet and one outlet fluidly coupled together at a generally perpendicular angle;

an inner plate having a bend therein such that a first portion and a second portion of said inner plate are defined, said first portion being orientated perpendicular to said second portion, said first portion having a peripheral edge including a bottom edge, an upper edge abutting said second portion and a pair of lateral edges, said first portion having a first aperture therein having generally a same shape as said pipe, said first aperture having a smaller size than said pipe such that said first aperture defines a saddle for said pipe, said pipe being positionable in said first aperture such that said pipe abuts a peripheral edge of said first aperture and said outlet is directed away from upper edge, said second portion having a plurality of bores extending therethrough;

an outer plate having a bend therein such that a first section and a second section of said outer plate are defined, said first section being orientated perpendicular to said second section, said first section having a perimeter edge including a lower edge, a top edge abutting said second section and a pair of side edges, said first section having a second aperture therein having generally a same shape as said pipe, said second aperture having a smaller size than said pipe such that said second aperture defines a saddle for said pipe, said pipe being positionable in said second aperture such that said pipe abuts a peripheral edge of said second aperture and said outlet is directed away from top edge, said second section having a plurality of bores extending therethrough, said first aperture in said inner plate being aligned with said second aperture in said outer plate when said second section is abutted against said second portion, said pipe being positionable in each of said first and second apertures when said first and second apertures are aligned such that said pipe is secured between said first portion and said first section, said bores in said second portion being aligned with said bores in said second section when said pipe is positioned in each of said first and second apertures;

a plurality of fasteners, each of said fasteners extending through aligned pairs of said bores and into a hood housing;

a plurality of securing members, each of said securing members extending through and removably securing together said first portion and said first section when said pipe is positioned in aligned ones of said apertures;

a fire retardant supply line being fluidly coupled to said inlet; and a nozzle being fluidly coupled to said outlet.

* * * * *